US007726124B2

(12) United States Patent
Gram

(10) Patent No.: US 7,726,124 B2
(45) Date of Patent: Jun. 1, 2010

(54) BLAST SIMULATOR WITH HIGH VELOCITY ACTUATOR

(75) Inventor: Martin M. Gram, Minneapolis, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 294 days.

(21) Appl. No.: 11/704,641

(22) Filed: Feb. 8, 2007

(65) Prior Publication Data

US 2008/0190286 A1 Aug. 14, 2008

(51) Int. Cl.
*F16D 31/02* (2006.01)

(52) U.S. Cl. .............................. 60/416; 91/423; 91/453

(58) Field of Classification Search .................... 60/416, 60/413; 91/423, 453
See application file for complete search history.

(56) References Cited

U.S. PATENT DOCUMENTS

| | | | | |
|---|---|---|---|---|
| 3,387,541 A * | 6/1968 | Bade | 91/461 |
| 3,715,069 A * | 2/1973 | O'Conner | 227/130 |
| 3,762,160 A | 10/1973 | Kramer | |
| 4,052,850 A * | 10/1977 | Mohaupt | 60/416 |
| 4,290,343 A | 9/1981 | Gram | |
| 4,808,026 A | 2/1989 | Clarke, Jr. et al. | |
| 7,077,621 B2 | 7/2006 | Ruden | |

* cited by examiner

*Primary Examiner*—F. Daniel Lopez
(74) *Attorney, Agent, or Firm*—Westman, Champlin & Kelly, P.A.

(57) ABSTRACT

A high velocity actuator, which may be used as a blast simulator, is provided with an actuator cylinder tube having an opening at first and second cylinder ends, and an actuator piston rod slidably mounted within the actuator cylinder tube and extending through the opening in the first cylinder end. A control valve concentric to the actuator cylinder tube is configured to be coupled to a source of pressurized fluid and controls admittance of the fluid under pressure to the actuator cylinder at the second cylinder end to act on the actuator piston rod to extend the actuator piston rod towards the first cylinder end.

22 Claims, 4 Drawing Sheets

BLAST SIMULATOR WITH HIGH VELOCITY ACTUATOR

FIELD

The embodiments of the present invention relate to the field of high velocity actuators, such as can be used in blast simulators, among other uses.

BACKGROUND

High velocity actuators have been employed in a wide number of areas. For example, high rate (velocity) actuators have been used to perform tensile rate dependency tests on metals and plastics, and for performing compression tests to determine properties related to forging of materials. High velocity actuators have been made to impact the muzzle of an artillery weapon to test the recoil mechanism without actually firing a projectile. In other uses, a sled or table has been accelerated to a high velocity. The sled or table with an installed test article impacts a spring, damper, or mass to subject the test article to a controlled shock test. Actuators have also been used to accelerate simulated heads to a desired velocity to test the properties of helmets, padded dashboards, and other objects designed to protect people in crashes. Actuators have been used to accelerate a mass to a controlled velocity and allowed it to impact a hydraulic cylinder to produce extremely high pressures in an artillery gun breech chamber to perform a fatigue test on the breech without firing the gun. Controlled actuators have been used to produce accelerations duplicating the acceleration of the passenger compartment of a car in a crash.

Such applications, described above, have involved the use of only a single actuator. Various methods were used for controlling the actuators, and included the use of a face seal, with the actuator piston acting as a valve. After a triggered release, the actuator piston allowed free flow of fluid from an accumulator into the actuator. Another method was the use of a high flow servo valve to control the flow from an accumulator to a small area actuator to provide high velocities. Fast opening solenoid valves have also been used, to provide uncontrolled flow from an accumulator into an actuator. Also employed have been servo controlled poppet valves. These are similar to the servo valve, but exhibit higher flow capability.

Another system, used to simulate the effect of a terrorist bomb on structural components of civil structures, employs multiple actuators to accelerate masses to a velocity for simultaneous impact on a structural element such as a reinforced concrete column. The impact velocity and mass of the impactors transfers an impulse (momentum) to the structure to duplicate the impulse measured from actual explosions. Control of the actuators was by servo-controlled poppet valves. This allowed starting all actuators simultaneously and provided the ability to adjust the command to the individual valves to achieve desired velocities and near simultaneous impact on all actuators.

Impact momentum is mass times velocity. The impulse and energy transferred to a specimen is a function of the ratio of the impact mass to the specimen mass and the losses in the impact spring. The best efficiency of energy transfer to the specimen during the impulse occurs when the two masses are close to equal.

In order to evaluate higher strength terrorist targets where the explosive might be set off very close to the structure, it is necessary to provide higher impact velocity. Doubling of the velocity is required to achieve four times the energy. However, previous blast generators have been limited to a velocity of about 30 meters/second. To increase the velocity to double, increasing the actuator stroke length is not an option due to piston rod weight and piston rod buckling considerations. To provide double the velocity in the same acceleration distance requires doubling the acceleration. The piston area must be doubled, requiring four times the flow at maximum velocity. Increasing the hydraulic pressure is possible, but hydraulic valves and fittings are not practical, since they are very expensive for pressures beyond normal working pressures for commercial hydraulic equipment.

SUMMARY

There is a need for a high velocity (i.e., high rate) hydraulic actuator, or blast simulator, that provides even greater velocity than previously achieved, but without the use of expensive hydraulic fittings, and with a minimal length increase.

These and other needs are met by embodiments of the present invention that provide a fluid actuator comprising an actuator cylinder tube having an opening at first and second cylinder ends. An actuator piston rod is slidably mounted within the actuator cylinder tube and extends through the opening in the first cylinder end. A source of fluid pressure is provided. A control valve is concentric to the actuator cylinder tube and configured to be coupled to a source of pressurized fluid to control admittance of the fluid under pressure to the actuator cylinder at the second cylinder end to act on the actuator piston rod to extend the actuator piston rod towards the first cylinder end.

The maximum valve orifice is defined by the circumference of the outer diameter of the actuator cylinder tube multiplied by the gap between the actuator cylinder tube and the seat of the control valve. This provides a control valve in which the maximum flow area of the valve can be readily made equal to the area of the actuator piston to maximize possible actuator velocity. Further, the valve configuration is short compared with a conventional port to achieve this flow, thereby reducing the overall length of the actuator.

The earlier stated needs are met by other embodiments of the invention that provide a blast simulator comprising an actuator piston rod carrying an impact mass and being slidable within an actuator cylinder tube. A control valve having a flow area at least equal to the cross-sectional area of the actuator piston rod is provided. The control valve controls admittance of fluid under pressure to the actuator piston rod.

The foregoing and other features, aspects and advantages of the disclosed embodiments will become more apparent from the following detailed description and accompanying drawings.

DETAILED DESCRIPTION

Embodiments of the present invention address problems that limited the velocity achieved by high velocity actuators. These problems are solved, at least in part, by embodiments of the present invention which provide a fluid actuator comprising an actuator cylinder tube having an opening at first and second cylinder ends. An actuator piston rod is slidably mounted within the actuator cylinder tube and extends through the opening in the first cylinder end. A control valve is concentric to the actuator cylinder tube and configured to be coupled to a source of pressurized fluid to control admittance of the fluid under pressure to the actuator cylinder at the second cylinder end to act on the actuator piston rod to extend the actuator piston rod towards the first cylinder end. With this arrangement, the maximum valve orifice is defined by the circumference of the outer diameter of the actuator cylinder tube multiplied by the gap between the actuator cylinder tube and the seat of the control valve. This provides a control valve in which the maximum flow area of the valve can be readily made equal to the area of the actuator piston to maximize possible actuator velocity. Further, the valve configuration is short compared with a conventional port to achieve this flow, thereby reducing the overall length of the actuator. The high velocity actuator provides a flow path from single or multiple accumulators with very little flow restriction.

Figure 1:
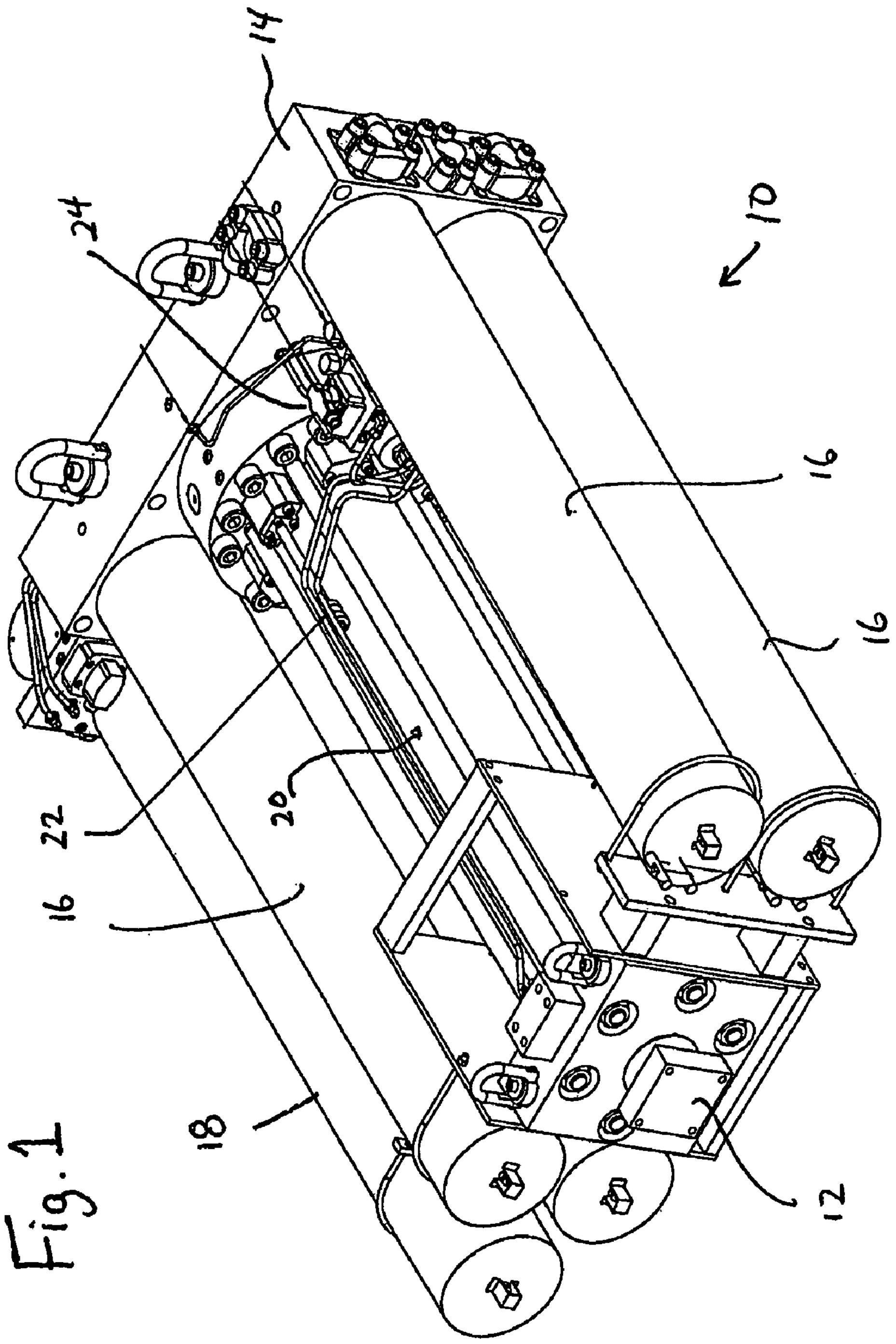
FIG. 1 is a perspective view of a high velocity actuator that may be employed as a blast simulator, constructed in accordance with embodiments of the present invention.

FIG. 1 is a perspective view of a high velocity actuator 10, which can be used as a blast simulator, constructed in accordance with certain embodiments of the present invention. This depiction is exemplary only, however, as other embodiments may be configured differently. FIG. 1 shows a single high velocity actuator 10, but certain embodiments provide a plurality of such actuators 10 that are simultaneously controlled, for example, to simulate a blast.

The high velocity actuator 10 carries an impact mass 12 at one end thereof. The impact mass 12 is controlled to be pushed out at high velocity at the end of an actuator piston rod (not shown in FIG. 1). The impact of the impact mass 12 against a structural element (such as a building column) can simulate a blast or other event. The high velocity actuator 10 has a base 14, to which a plurality of pressure accumulators 16 are attached. A return accumulator 18 is also provided.

A central cylinder section 20 is provided that includes an actuator cylinder tube and piston rod assembly (not shown) that carries the impact mass 12. Certain components cause the impact mass 12 to be accelerated and attain a high velocity. These include a linear variable differential transformer (LVDT) assembly 22, a poppet valve (not shown in FIG. 1, but housed in base 14 and slides on the cylinder 20) that acts as a control valve, and a servo valve assembly 24 that controls flow that controls the position of a poppet pilot valve. Due to the construction of the control valve, among other features, the assembly may be relatively compact in length, and avoids the concerns that would be created by increasing the actuator stroke length, such as piston rod weight and piston rod buckling concerns.

Figure 2:
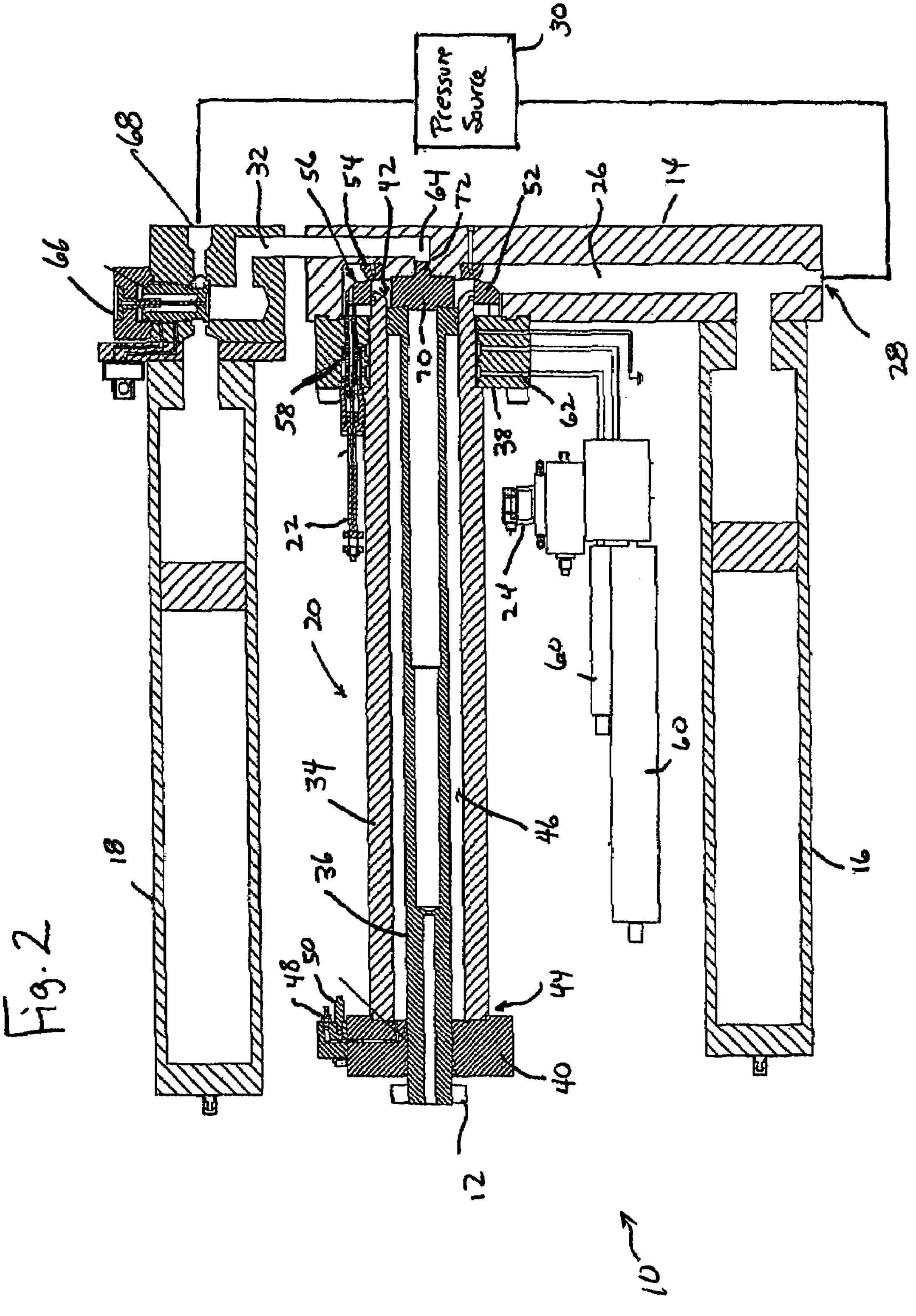
FIG. 2 is a sectional view through some of the components of the high velocity actuator of FIG. 1.

FIG. 2 is a partially sectional view of the high velocity actuator 10 of FIG. 1. The base 14 of the high velocity actuator 10 forms an input flow path 26 that is connected at a pressure port 28 to a source 30 of pressurized fluid, such as oil. The use of oil as a pressurized fluid is exemplary only, as other types of fluids may be employed, both liquid and gas. The base 14 also forms a return flow path 32 that returns fluid to the return accumulator 18 after an impact stroke.

Figure 3:
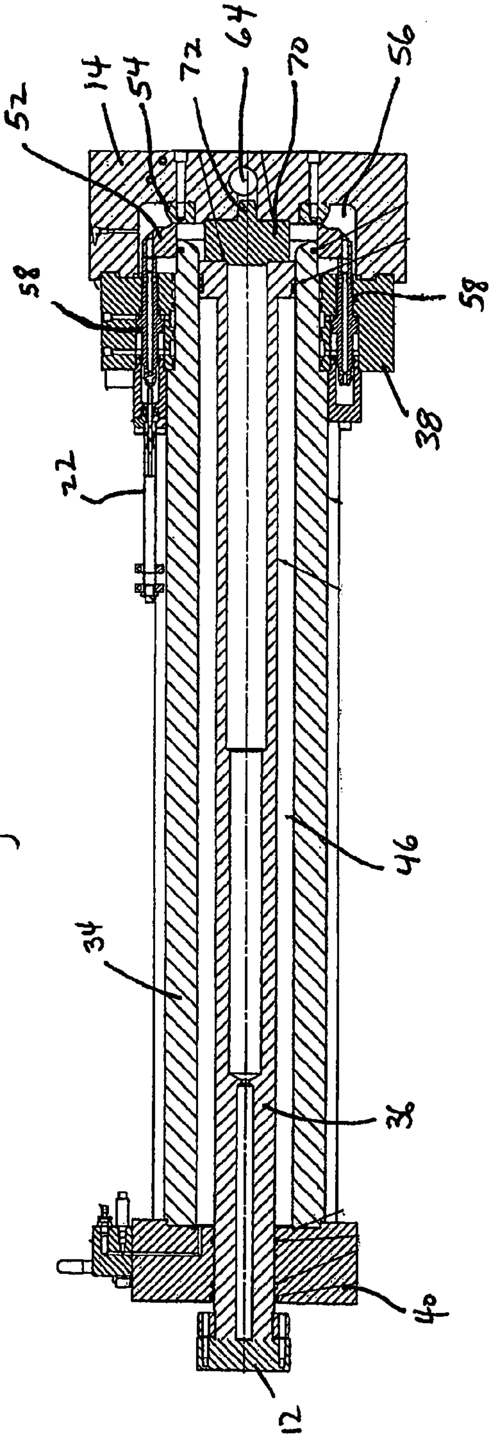
FIG. 3 is a cross-sectional view of the actuator cylinder section of the high velocity actuator of FIG. 1.
Figure 4:
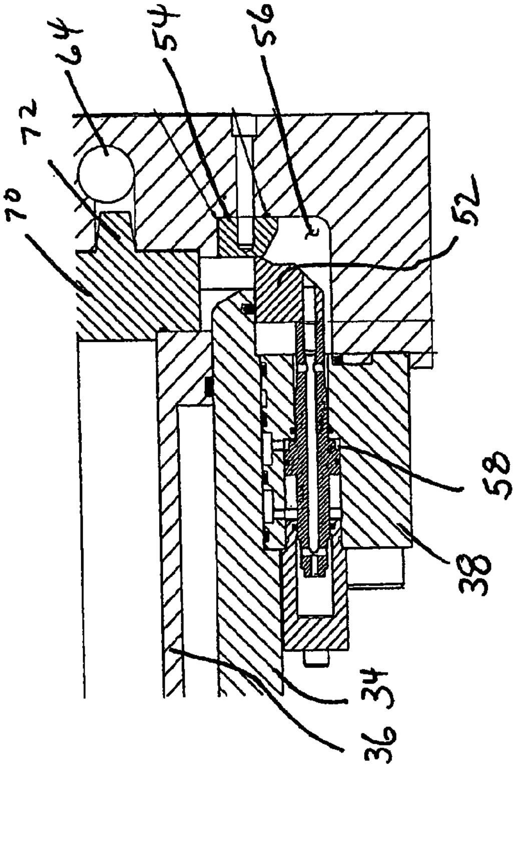
FIG. 4 is a cross-sectional view of a portion of the actuator cylinder section of FIG. 3.

In addition to FIG. 2, reference will also be made now to FIGS. 3 and 4, which illustrate the central cylinder section 20 in isolation and a detail of that section. The central cylinder section 20 includes an actuator cylinder tube 34 connected to the base 14 by a collar 38. The actuator cylinder tube has a first cylinder end 42 and a second cylinder end 44. The actuator cylinder tube 34 carries an actuator piston rod 36 that is slidable axially within the actuator cylinder tube 34. In certain embodiments, such as the illustrated embodiment, the actuator piston rod 36 is hollow, thereby saving weight. The actuator piston rod 36 extends from the actuator cylinder tube 34 through a piston guide 40 and carries the impact mass 12.

A deceleration chamber 46 is formed within the actuator cylinder tube 34. In certain embodiments, the deceleration chamber is pressurized with compressible fluid, such as nitrogen gas, through a deceleration charge valve 48. A deceleration pressure transducer 50 provides a signal to a controller (not shown) indicating the pressure within the deceleration chamber 46. The pressure (such as nitrogen pressure) in the deceleration chamber 46 provides the force to decelerate and retract the actuator piston rod 36 to the retracted position that is illustrated in FIGS. 2-4. In certain other embodiments, an incompressible fluid, such as oil, is employed. A large port is then needed to allow the fluid to escape to an accumulator during acceleration, and valves are required to control the pressure.

A control valve is provided at the first cylinder end 42 of the actuator cylinder tube 34. The control valve comprises a first cylinder 52 that is concentric to the actuator cylinder tube 34 and a second cylinder 54 that forms a valve seat. The control valve is a poppet valve in the illustrated embodiment, with the first cylinder 52 forming a poppet 52 and the second cylinder 54 forming a poppet seat 54. The poppet 52 of the control valve has an inner diameter that slides on and is sealed to the outer diameter of the actuator cylinder tube 34. The poppet seat 54 is concentric to the actuator cylinder tube 34, but separated by a gap from this tube 34. When the control valve is closed, the poppet 52 is in contact with the poppet seat 54, as depicted in FIGS. 2-4. The maximum valve orifice is defined by the circumference of the actuator cylinder tube 34 outer diameter times the gap between the actuator cylinder tube 34 and the poppet seat 54.

The control valve is depicted in the closed position in FIGS. 2-4. The control valve seals the gap between the actuator cylinder tube 34 and the poppet seat 54. High-pressure hydraulic fluid will fill an outer chamber 56 around the control valve. The outer chamber 56 is ported to the pressure accumulators 16 that provide the high flow rates needed in the testing procedure.

This configuration provides a flow path from single or multiple accumulators with very little flow restriction. The maximum flow area of the control valve can readily be made equal to the area of the actuator piston rod 36 to maximize possible actuator velocity. Since the valve configuration is short compared with a conventional port for this flow, the overall length of the actuator is reduced.

The position of the poppet 52 is controlled by multiple actuator pistons 58 in the illustrated embodiments. FIG. 3 depicts multiple actuator pistons 58, while FIGS. 2 and 4 illustrate only one such piston 58 for illustration purposes. The actuator pistons 58 are connected to the poppet 52 and control position of the poppet 52. The actuator pistons 58 are controlled in their movement by the servo valve assembly 24. One or more pressure accumulators 60 are provided and coupled to the servo valve assembly 24 to provide controlled pressurized fluid to control the movement of the actuator pistons 58. The pressurized fluid is provided to the actuator pistons 58 through fluid connections 62 in the collar 38.

The pressure on the ends of the poppet 52 is interconnected to prevent any substantial imbalance of force on the poppet 52. The rod ends of the actuator pistons 58 are ported together to prevent a force imbalance. The multiple actuator pistons 58 are hydraulically connected, in parallel, to the servo valve assembly 24. The position of the poppet 52 is controlled using feedback from one or more LVDTs 22 associated with one or more of the actuator pistons 58.

A return flow port 64 communicates with the return flow path 32 that is connected to a servo-controlled poppet valve 66 and to the return accumulator 18. The return flow path 64 is connected, through the poppet valve 66 to return port 68 through which fluid is returned to the pressure source 30.

The actuator piston rod 36 carries an actuator cushion 70 with a flow restriction portion 72. The return flow port 64 has an opening into which the flow restriction portion 72 of the actuator cushion 70 when the actuator piston rod 36 is in the fully retracted position illustrated. After a test, the actuator piston rod 36 is returned to the retracted position by the return poppet valve 66. The return poppet valve 66 has high flow capability, due to its use in controlling the impact, so the piston rod velocity needs to be reduced before its impact with the base 14. The tapered flow restriction portion 72 fits into the opening of the return flow port 64, and as it restricts the return flow, pressure builds up, slowing the actuator rod piston 36.

The configuration of the input flow path 26, return flow path 32 and the actuator cushion 70 has certain advantages. Since the path 26 for flow into the actuator cylinder tube 34 is not through the same port 64 as the return flow, a test may be started when the actuator piston rod 36 is at the fully retracted position and the actuator cushion 70 is in the return flow port 64. Full flow is available to accelerate the actuator piston rod 36 even when the actuator cushion 70 is in the return flow port 64. This increases the active stroke of the actuator piston rod 36 by the length of the actuator cushion 70.

A stroke transducer (not shown) measures the position of the impact mass 12 mounted to the end of the actuator piston rod 36. The actuator piston rod 36 is positioned by the control valve and the return poppet valve 66 in closed loop control using the stroke transducer as feedback. The closed loop mode may be used for setup.

Figure 5:
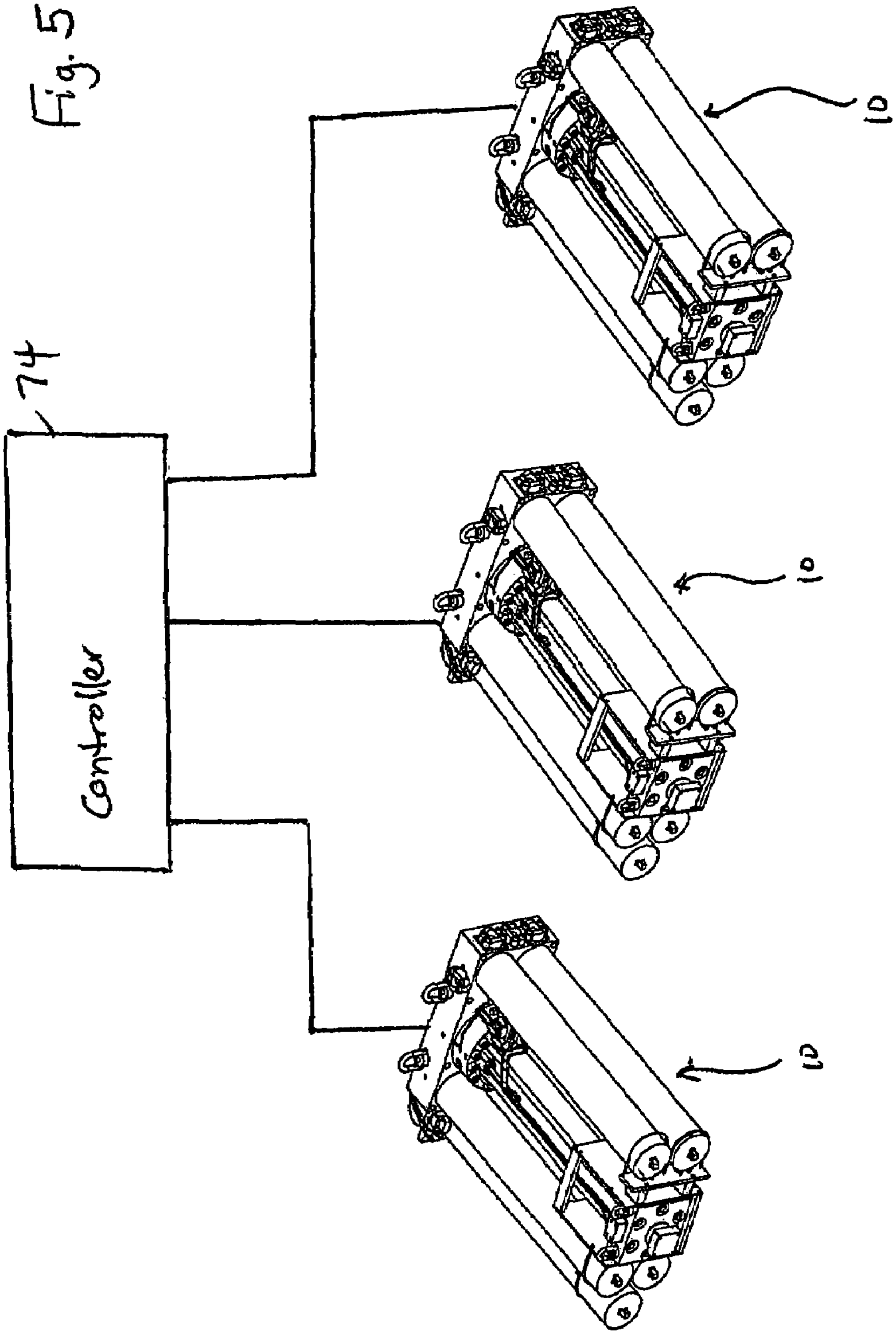
FIG. 5 is a schematic depiction of an embodiment of the present invention employing multiple high velocity actuators.

FIG. 5 depicts a setup in which a plurality of high velocity actuators 10 are controlled by a controller 74. With multiple high velocity actuators 10, control can be made to have the actuators 10 respond to the same commands, or to be controlled to different velocities but the same time of impact.

In a test run, setup parameters are determined for achieving a desired impact velocity and a time of impact (if multiple high velocity actuators 10 are used in the test). The actuator piston rod 36, with its impact mass 12, is commanded to a position that is a predetermined distance from the specimen. The fluid in the pressure accumulators 16, such as oil, is pressurized to a desired pressure. The servo valve assembly 24 controls the multiple actuator pistons 58 to ramp open the control valve formed by the poppet 52 and the poppet seat 54 to a determined position. The pressurized fluid flows into the outer chamber 56 and provides the force to accelerate the actuator piston rod 36 and impact mass 12. The return poppet valve 66 is opened, and the impact mass 12 impacts the specimen. The pressure in the deceleration chamber 46 accelerates the actuator piston rod 35 and impact mass 12 towards the retracted position. A small distance before the actuator piston rod 36 reaches the fully retracted position, the flow restriction portion 72 enters the return flow port 64 restricting the flow. This causes an increase of pressure, which slows the piston velocity.

Although the present invention has been described and illustrated in detail, it is to be clearly understood that the same is by way of illustration and example only and is not to be taken by way of limitation.

What is claimed:

1. A fluid actuator comprising:

an actuator cylinder tube having an opening at first and second cylinder ends;

an actuator piston rod slidably mounted within the actuator cylinder tube and extending through the opening in the first cylinder end;

a control valve concentric to the actuator cylinder tube and configured to be coupled to a source of pressurized fluid to control admittance of the fluid under pressure to the actuator cylinder at the second cylinder end to act on the actuator piston rod to extend the actuator piston rod towards the first cylinder end; and a plurality of actuators positioned along a circumference of the control valve and, each actuator being coupled to the control valve to control a position of the control valve.

2. The actuator of claim 1, wherein the control valve comprises a first cylinder concentric to the actuator cylinder tube and a valve seat separated by a gap from the first cylinder when the control valve is in an open position.

3. The actuator of claim 2, wherein the actuator cylinder tube has an outer diameter and the first cylinder has an inner diameter that slides on and is sealed to the outer diameter of the actuator cylinder tube.

4. The actuator of claim 3, wherein the source of fluid includes a plurality of fluid accumulators coupled to the control valve by an input flow path.

5. The actuator of claim 4, further comprising a mass carried on the actuator piston rod.

6. The actuator of claim 4, further comprising a return flow port separate from the input flow path.

7. The actuator of claim 6, wherein the return flow port has an opening and further comprising an actuator cushion having a flow restriction portion configured for reception into the return flow port, the actuator cushion coupled to and carried by the actuator piston rod.

8. The actuator of claim 1, wherein the plurality of actuators are simultaneously controllable to position the control valve.

9. The actuator of claim 1, wherein the plurality of actuators are connected in parallel so as to be simultaneously controllable.

10. The actuator of claim 1, wherein the plurality of actuators are configured so control the position of the control valve with balanced force on the control valve.

11. An actuator comprising:

an actuator cylinder tube;

an actuator piston rod carrying and being slidable within the actuator cylinder tube;

a control valve having a flow area at least equal to the cross-sectional area of the actuator piston rod, the control valve controlling admittance of fluid under pressure to the actuator piston rod, wherein the control valve has a poppet that is concentric to and slidable on the actuator cylinder tube and a poppet seat separated by a gap from the poppet and end of the actuator cylinder tube when the control valve is in an open position; and a plurality of poppet actuators positioned around the circumference of the poppet, each actuator being coupled to the poppet and arranged to control positioning of the poppet with respect to the poppet seat.

12. The actuator of claim 11, further comprising a base to which the actuator cylinder tube is mounted, the base having an input flow path fluidly coupled to the control valve and a return flow path that is separate from the input flow path.

13. The actuator of claim 12, wherein the return flow path includes a return flow port with an opening, and further comprising an actuator cushion on the actuator piston rod, the actuator cushion having a flow restriction position configured for reception into the return flow port to restrict flow of hydraulic fluid into the return flow path.

14. The actuator of claim 11, further comprising a plurality of fluid accumulators coupled to the control valve by an input flow path to simultaneously supply pressurized fluid to the actuator piston rod when the control valve is opened.

15. The actuator of claim 11, wherein the poppet actuators are hydraulically actuated and connected in parallel so as to be simultaneously controllable to position the poppet with balanced force on the poppet.

16. The actuator of claim 11, wherein the poppet actuators are actuated and connected in parallel so as to be simultaneously controllable to position the poppet with balanced force on the poppet.

17. The actuator of claim 11, further comprising a controller coupled to a plurality of blast simulators and configured to simultaneously control operation of the plurality of blast simulators.

18. An actuator comprising:

an actuator cylinder tube;

an actuator piston rod slidable within the actuator cylinder tube;

a control valve controlling admittance of fluid under pressure to the actuator piston rod, wherein the control valve has a poppet that is concentric to and slidable on the actuator cylinder tube and a poppet seat separated by a gap from the poppet and end of the actuator cylinder tube when the control valve is in an open position; and a plurality of poppet actuators positioned along the circumference of the poppet, each actuator being coupled to the poppet and arranged to control positioning of the poppet with respect to the poppet seat.

19. The actuator of claim 18, wherein the plurality of actuators are simultaneously controllable to position the control valve.

20. The actuator of claim 18, wherein the plurality of actuators are connected in parallel so as to be simultaneously controllable.

21. The actuator of claim 18, wherein the plurality of actuators are configured so control the position of the control valve with balanced force on the control valve.

22. The actuator of claim 18, wherein the actuator cylinder tube has an outer diameter and the control valve has an inner diameter that slides on and is sealed to the outer diameter of the actuator cylinder tube.

* * * * *